US007617620B2

(12) United States Patent
Fukudome et al.

(10) Patent No.: US 7,617,620 B2
(45) Date of Patent: Nov. 17, 2009

(54) WORK VEHICLE WITH STAGGERED CONTROL LEVEL

(75) Inventors: Hiroki Fukudome, Sakai (JP); Eiji Miyazaki, Sakai (JP); Masataka Takagi, Sakai (JP); Shuichi Takeshita, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/726,378

(22) Filed: Mar. 21, 2007

(65) Prior Publication Data

US 2008/0016976 A1 Jan. 24, 2008

(30) Foreign Application Priority Data

Jul. 19, 2006 (JP) ............................. 2006-197373

(51) Int. Cl.
*E02F 5/02* (2006.01)
*B60K 26/00* (2006.01)

(52) U.S. Cl. ............................. 37/442; 37/348; 37/382; 180/315; 414/699

(58) Field of Classification Search ................... 37/442, 37/445, 348, 382, 415; 414/699, 700, 698; 172/274; 180/315, 324, 333, 6.32, 331; 91/522; 74/469, 471 XY
See application file for complete search history.

(56) References Cited

U.S. PATENT DOCUMENTS 3,539,068 A * 11/1970 Seaberg ...................... 414/701
3,633,436 A * 1/1972 Freiburger ............. 74/471 XY
3,893,346 A * 7/1975 Paul ......................... 74/471 R
4,041,976 A * 8/1977 Brownell .................... 137/351
4,085,812 A * 4/1978 Robinson et al. ........... 180/6.48
4,736,647 A * 4/1988 Shimoie et al. ........ 74/471 XY
4,966,518 A * 10/1990 Kourogi et al. ............. 414/700
5,149,023 A * 9/1992 Sakurai et al. .............. 244/229
5,232,057 A * 8/1993 Renard ....................... 172/812
5,316,435 A * 5/1994 Mozingo .................... 414/685
5,429,037 A * 7/1995 Weber et al. .................. 91/522
5,497,847 A * 3/1996 Ota et al. ..................... 180/333
5,553,992 A * 9/1996 Ashcroft ..................... 414/685
6,112,612 A * 9/2000 Seksaria et al. ........ 74/471 XY
6,202,501 B1 * 3/2001 Ikari .......................... 74/496

FOREIGN PATENT DOCUMENTS

JP 10-280473 10/1998
JP 2001-140276 A 5/2001

* cited by examiner

*Primary Examiner*—Thomas A Beach
(74) *Attorney, Agent, or Firm*—The Webb Law Firm

(57) ABSTRACT

A work vehicle with a working implement, comprising: a control lever 49 for controlling the working implement 3, the control lever being rockably disposed laterally of a driver's seat 16 mounted on a vehicle body 7; a control valve 52 disposed laterally of the vehicle body for controlling actuators 32, 44 that drive the working implement; and interlocking links 56, 57 for interlocking the control lever and spools 54, 55 of the control valve 52, and transmitting rocking of the control lever to the spools; wherein the control lever 49 and the spools 54, 55 are staggered transversely and longitudinally of the vehicle body 7, and the interlocking links 56, 57 are bent, one end of each interlocking link being connected to a first link connector 72, 68*c* connected to the control lever, the other end of each interlocking link being connected to a second link connector connected to one of the spools.

5 Claims, 18 Drawing Sheets

WORK VEHICLE WITH STAGGERED CONTROL LEVEL

TECHNICAL FIELD

This invention relates to a work vehicle having a working implement such as a front loader attached to a running vehicle such as a tractor.

BACKGROUND ART

Conventionally, an existing work vehicle has a front loader attached to the front of a tractor.

This work vehicle includes a main frame disposed in a lateral front portion of a tractor body. The front loader has a boom pivotally connected at a rear end thereof to an upper portion of the main frame to be vertically swingable, a boom cylinder for swinging the boom, a bucket pivotally connected to a forward end of the boom to be swingable, and a bucket cylinder for swinging the bucket.

The work vehicle further includes a boom control valve for controlling the boom cylinder, a bucket control valve for controlling the bucket cylinder, and a single control lever for operating the spools of the boom control valve and bucket control valve (Japanese Patent Application JP2001-140276 A and Japanese Patent Application JP10-280473A).

Problem to be Solved by the Invention

With the work vehicle, it has been considered to provide the control lever adjacent and laterally of the driver's seat mounted on the vehicle body, and to arrange the control valves laterally of the vehicle body and below the control lever.

Where the control lever and control valves are arranged vertically, and particularly where the control valves are arranged substantially under the control valve, the control lever and the spools of the control valves can be interlocked through straight links. This simplifies an interlocking mechanism that interlocks the control lever and the spools of the control valves. It is difficult, however, to arrange the control valves under the control lever because of the operability of the control lever, and the convenience in accommodating the control lever and control valves. Thus, the control lever and control valves may be arranged as staggered in the fore and aft direction and transverse direction.

On the other hand, obstacles (interfering objects) are present laterally of the driver's seat, which include a rear wheel fender, levers such as a position control lever, an accelerator lever and so on, and support elements for these levers. In order to keep clear of these obstacles, the interlocking mechanism that interlocks the control lever and the spools must include a number of relays in intermediate positions thereof for transmitting action from one link to another. This poses a problem of complicating the interlocking mechanism between the control lever and the spools.

The object of this invention, therefore, is to provide a work vehicle that solves the above problem.

Means for Solving the Problem

A work vehicle with a working implement, according to this invention, comprises:

a control lever for controlling the working implement, said control lever being rockably disposed laterally of a driver's seat mounted on a vehicle body;

a control valve disposed laterally of the vehicle body for controlling actuators that drive said working implement; and interlocking links for interlocking said control lever and spools of said control valve, and transmitting rocking of said control lever to said spools;

wherein said control lever and said spools are staggered transversely and longitudinally of said vehicle body, and said interlocking links are bent, one end of each interlocking link being connected to a first link connector connected to said control lever, the other end of each interlocking link being connected to a second link connector connected to one of said spools.

According to this construction, the interlocking links connected to the link connectors adjacent the control lever and the spools of the control valve are bent, so that the lower ends of the interlocking links may be located adjacent the spools. Therefore, even though the link connectors and spools are staggered in the transverse direction and fore and aft direction, and obstacles are present between the link connectors and spools, a single interlocking link can extend clear of the obstacles to interlock each pair of link connector and spool. This realizes a simplified interlocking mechanism for interlocking the control lever and spools.

In the above work vehicle, said second link connector, preferably, is a rocking arm rockable about an axis, said one of said spools being linearly movable by rocking of said rocking arm.

Where, for example, the second link connector is formed on each spool and one bent interlocking link is connected to the second link connector, a twisting force may occur between the spool and the valve body. In this construction, on the other hand, the lower end of each interlocking link is pivotally connected to the rocking arm rockable about the pivot, and the spool is linearly movable by rocking of the rocking arm. Thus, even where the link connector and spool staggered relative to each other in the transverse direction and the fore and aft direction are interlocked by one bent interlocking link, no twisting force will occur between the spool and the valve body.

It is preferred that the above work vehicle further comprises soil spill preventive means operable, when a bucket provided for said working implement inclines toward the said driver's seat in excess of a predetermined degree, to transmit movement of said bucket to said rocking arm, and to operate said one of the spools through the rocking arm for stopping the movement of said bucket.

The soil spill preventive means, preferably, includes an interlocking member disposed adjacent the rocking arm to be rockable about a pivot, and a feedback mechanism for feeding the movement of said bucket back to said interlocking member, said interlocking member being engageable with an engaging portion of the rocking arm to rock said rocking arm.

With this construction, the bucket is prevented from inclining toward the said driver's seat in excess of a predetermined degree. This prevents soil scooped into the bucket from spilling toward the driver.

BEST MODE FOR CARRYING OUT THE INVENTION

An embodiment of this invention will be described hereinafter with reference to the drawings.

In FIG. 13, numeral 1 is a work vehicle called TLB including a tractor (running vehicle) 2 with a front loader 3 attached to the front of the tractor 2, and a backhoe 4 attached to the rear of the tractor 2.

The tractor 2 is a two-axle four-wheel type tractor 2 having a pair of right and left front wheels 5 and a pair of right and left rear wheels 6 for supporting and running a vehicle body 7. The vehicle body 7 of the tractor 2 in this embodiment, as shown in FIGS. 1 and 14, includes, successively connected rearwardly of an engine 8, a clutch housing (or flywheel housing) 9, a center frame 10, a transmission case 11 and a differential case 12.

The center frame 10 connecting the clutch housing 9 and transmission case 11 is formed of sheet metal, or a combination of plates. Power from the engine 8 is transmitted from the clutch housing 9 to the transmission case 11 through a transmission shaft 19 extending inside the center frame 10.

Front axle frames 13 are fixedly bolted to lower portions of right and left sides of the engine 8, to extend forward from the engine 8. The front axle, frames 13 support a battery, a radiator, a fuel tank and so on. The engine 8, battery, radiator, fuel tank and so on are covered by a hood 14.

The vehicle body 7 has rear wheel fenders 15 provided at right and left sides of a rear portion thereof for covering transversely inward sides of the right and left rear wheels 6. A driver's seat 16 is disposed between the right and left rear wheel fenders 15 to be switchable between a forward facing position and a backward facing position. This driver's seat 16 is supported through a seat support device 17 on the vehicle body 7 of the tractor 2 (see FIG. 3). A steering wheel 18 is disposed forwardly of the driver's seat 16.

The vehicle body 7 has a working implement mounting frame 21 for attaching the front loader 3 and backhoe 4 to the tractor 2.

The working implement mounting frame 21 includes main frames 22 formed of plates arranged at the right and left sides of the vehicle body 7. A forward portion of each main frame 22 is penetrated, in the right and left direction, by and fixedly welded to a transversely inward portion of a cylindrical support base 23 having an axis extending transversely of the vehicle body 7.

Each of the right and left support bases 23 has a mounting bracket 24 fixed such as by welding to and projecting forward from a transversely inward position thereof. The right and left mounting brackets 24 are connected to each other by a connecting member 25 disposed below the clutch housing 9, and are fixed, such as by bolts, to outer lateral surfaces of the front axle frames 13.

With the above structure, the front of the working implement mounting frame 21 is attached to the vehicle body 7.

The rear of the working implement mounting frame 21 is attached to the vehicle body 7 by fixedly bolting the right and left main frames 22 to the differential case 12.

Each of the right and left support bases 23 has a mast 26 fixed to and projecting upward from an outer lateral end thereof. The right and left masts 26 act as loader mounts for detachably attaching the front loader 3.

Each of the right and left main frames 22 has a backhoe mount 27 provided in a rearward position thereof for detachably attaching the backhoe 4.

As shown in FIGS. 13, 15 and 16, the front loader 3 includes booms 29 each pivotally connected at a rear end thereof to an upper position of one of the right and left masts 26 through a boom pivot 28 to be swingable about a transverse axis, and a bucket 31 pivotally connected in lower positions of a rear wall thereof to forward ends of the right and left booms 29 through a bucket pivot 30 to be swingable about a transverse axis.

The bucket 31 has an earth and sand accommodation space opening forward.

Each of the right and left booms 29 is vertically swingable about the boom pivot 28 by extension and contraction of a boom cylinder 32 (actuator) extending between the mast 26 and boom 29 on the same right or left side. The bucket 31 is driven to make scooping and dumping movements (i.e. vertically swingable about the bucket pivot 30) by extension and contraction of a bucket cylinder 33 (actuator) extending between each of the right and left booms 29 and bucket 31.

These right and left boom cylinders 32 and bucket cylinders 33 are hydraulic cylinders. Each boom cylinder 32 is disposed below a rear portion of one of the booms 29. Each bucket cylinder 33 is disposed above a forward portion of one of the booms 29.

Each boom cylinder 32 has a cylinder rod with a distal end thereof pivotally connected to a vertical intermediate position of one of the masts 26 to be swingable about a transverse axis. The bottom end of each boom cylinder 32 is pivotally connected to a longitudinally intermediate position of one of the booms 29 to be swingable about a transverse axis.

The bottom end of each bucket cylinder 33 is pivotally connected to a longitudinally intermediate position of one of the booms 29 through a pin 34 to be swingable about a transverse axis. Each bucket cylinder 33 has one end of a first link 36 and one end of a second link 37 pivotally connected to a distal end of a cylinder rod thereof through a pin 38 to be swingable about a transverse axis.

The other end of the first link 36 is pivotally connected to a position above the bucket pivot 30 on the rear wall of the bucket 31 through a pin 39 to be swingable about a transverse axis. The other end of the second link 37 is pivotally connected to a forward position of one of the booms 29 rearwardly of the bucket pivot 30 through a pin 40 to be swingable about a transverse axis.

As shown in FIG. 13, the backhoe 4 includes a base 41 detachably attached to the rear of the working implement mounting frame 21, a swing bracket 42 supported by the rear of the base 41 to be swingable right and left about a vertical axis, a boom 43 pivotally connected to a lower portion of the swing bracket 42 to be swingable about a transverse axis, an arm 44 pivotally connected to a distal end of the boom 43 to be swingable about a transverse axis, a bucket 45 pivotally connected to a distal end of the arm 44, and outriggers (not shown) arranged at opposite sides of the base 41.

The swing bracket 42 is swingable right and left by extension and contraction of a swing cylinder mounted between the base 41 and swing bracket 42. The boom 43 is vertically swingable by extension and contraction of a boom cylinder 46 extending between the swing bracket 42 and boom 43. The arm 44 is vertically swingable by extension and contraction of an arm cylinder 47 extending between the boom 43 and arm 44. The bucket 45 is driven to make scooping and dumping movements by extension and contraction of a bucket cylinder 48 extending between the bucket 45 and arm 44. The right and left outriggers are vertically swingable by outrigger cylinders extending between the outriggers and base 41, respectively.

As shown in FIGS. 1 through 14, the booms 29 and bucket 31 are swingable by a control lever (which is called a loader control lever) 49 disposed adjacent and laterally of the driver's seat 16, and more particularly at the front and rightward of the driver's seat 16 and forward and upward of the rear wheel fender 15. A position control lever 50 and an accelerator lever 51 are arranged rearwardly of the loader control lever 49.

The position control lever 50 is used, when the backhoe 4 is removed and a working implement such as a rotary plow is vertically movably attached through a three-point linkage, for example, to effect position control of the working implement. The accelerator lever 51 is used to adjust the speed of the tractor 2.

A control valve 52 that controls the boom cylinders 32 and bucket cylinders 33 is disposed laterally of the vehicle body 7 below the loader control lever 49 (at the rear right-hand side of the transmission case 11 and transversely inward of the right-hand side main frame 22). Specifically, the control valve 52 is disposed at the front and lower right-hand side of the driver's seat 16. The control valve 52 is disposed as contained inside (under) a cover member 53 covering an area above the vehicle body 7.

This control valve 52 includes a boom control valve for controlling the boom cylinders 32, and a bucket control valve for controlling the bucket cylinders 33.

These control valves are in the form of direct acting spool type selector valves arranged so that spools 54 and 55 may slide up and down. The spools 54 and 55 are arranged to project upward.

The boom control valve and bucket control valve are arranged fore and aft. In this embodiment, the boom control valve is disposed in front, and the bucket control valve in the rear.

The loader control lever 49 and the spool 54 of the boom control valve are interlocked by an interlocking link 56 (which is called an interlocking link for the booms). The loader control lever 49 and the spool 55 of the bucket control valve are interlocked by an interlocking link 57 (which is called an interlocking link for the bucket).

The interlocking links 56 and 57 are formed of solid bars or pipes.

The loader control lever 49 is rockable fore and aft and right and left. The bucket cylinders 33 are extendible and contractible by rocking the loader control lever 49 right and left. The boom cylinders 32 are extendible and contractible by rocking the loader control lever 49 fore and aft.

In this embodiment, regarding bucket control, when the loader control lever 49 is rocked leftward the spool 55 of the bucket control valve is pulled up, whereby the bucket 31 carries out a scooping operation (i.e. is swung up). When the loader control lever 49 is rocked rightward, the spool 55 of the bucket control valve is depressed, whereby the bucket 31 carries out a dumping operation (i.e. is swung down).

Regarding boom control, when, for example, the loader control lever 49 is rocked forward, the spool 54 of the boom control valve is depressed, whereby the booms 29 are swung downward. When the loader control lever 49 is rocked backward, the spool 54 of the boom control valve is pulled up, whereby the booms 29 are swung upward.

The control valve 52 is fixed to a valve stay 58 formed of a plate and disposed transversely inward thereof. The valve stay 58 is fixed to a valve support 59 formed of a plate and disposed below and transversely inward of the valve stay 58 and attached to the vehicle body 7 (i.e. the transmission case 11 and differential case 12).

The valve stay 58 has a supporting wall 60 projecting transversely outward from an upper position thereof, and located adjacent an upper surface of the control valve 52. The spools 54 and 55 project upward through the supporting wall 60.

The supporting wall 60 has a support piece 61 fixed to and projecting upward from a rear end thereof. The support piece 61 has a pivot shaft 62 fixed thereto for rockably supporting the accelerator lever 51.

Fixed to the upper surface of the supporting wall 60 is a mounting wall 63*a* at a lower end of a lever stay 63 to be clear of the spools 54 and 55.

The lever stay 63 has a side wall 63*b* extending upward from a transversely outer edge of the mounting wall 63*a*, and then extending obliquely upward and forward. The lower end of the loader control lever 49 is rockably supported at the upper end of the side wall 63*b*.

The valve support 59, valve stay 58 and lever stay 63 constitute a mounting frame for attaching the loader control lever 49 and control valve 52 to the vehicle body 7. The loader control lever 49 and control valve 52 as assembled to this mounting frame can be attached to the vehicle body 7.

The lower end of the loader control lever 49 fixed to an upper surface of a block member 64 of rectangular parallelepiped shape. The lower end of the loader control lever 49 is covered by a cover panel 65 disposed on the upper surface of the rear wheel fender 15.

The lever stay 63 has a lever supporting wall 63*c* projecting transversely outward from a rearward position on a transversely outer surface of an upper portion of the side wall 63*b*. The lever supporting wall 63*c* has a support tube 67 fixed adjacent a transversely outward end thereof, the tube 67 having an axis extending fore and aft.

The support tube 67 supports a link stay 68 to be rotatable about the fore and aft axis.

The link stay 68 includes a back wall 68*a* supported by the support tube 67 through a pivot 69 to be rotatable about the fore and aft axis, side walls 68*b* extending forward from right and left sides of the back wall 68*a*, and a link connector 68*c* (which is called a link connector for the bucket) extending transversely outward (rightward) from a forward end of the right-hand (transversely outward) side wall 68*b*.

The block member 64 is disposed between the right and left side walls 68*b* of the link stay 68. The block member 64 is supported by the right and left side walls 68*b* of the link stay 68 through a pivot 70 to be rockable about a transverse axis.

A joint member 71 provided at the upper end of the interlocking link 57 for the bucket is pivotally connected to the link connector 68*c* for the bucket to be rockable about a fore and aft axis. A ball joint member 73 provided at the upper end of the interlocking link 29 for booms is pivotally connected to a link connector 72 (which is called a link connector for the booms) provided on the front surface of the block member 64 to be rockable about a fore and aft axis.

With the above construction, the loader control lever 49 is supported to be rockable fore and aft and right and left. When the loader control lever 49 is rocked right and left, the link stay 68 is rocked about the fore and aft axis to move the interlocking link 57 for the bucket up and down. When the loader control lever 49 is rocked fore and aft, the block member 64 is rocked about the transverse axis to move the interlocking link 56 for the booms up and down.

The loader control lever 49 is pivotally supported by a pivotal support having a lever lock mechanism 74 for locking the loader control lever 49 to be inoperable (against the fore and aft and right and left rocking) when the loader is unused.

The lever lock mechanism 74 includes a lock pin 75, a lock lever 76 for operating the lock pin 75, a lever engaging plate 77 for engaging the lock lever 76 in a lock position and a unlock position, and a lock tube 78 for receiving the lock pin 75 to lock the loader control lever 49.

The lock tube 78 is secured to the upper surface of the block member 64 and a front surface of the loader control lever 49 to have an axis extending transversely.

A guide tube 79 is disposed to the left of the lock tube 78 to be coaxial therewith. The guide tube 79 secured to a support stay 80 projecting obliquely forward and upward from the lever supporting wall 63*c*.

The lock pin 75 is received and supported in the guide tube 79 to be movable right and left. The lock pin 75 is movable right and left to switch between a lock position inserted into the lock tube 78 and an unlock position withdrawn from the lock tube 78.

The lock pin 75 fixed at a left end thereof to a left wall 81*a* of a mounting member 81. The lock lever 76 is fixed to, and projects forward from, a front wall 81*b* of the mounting member wall 81. The lock lever 76 is operable to move the lock pin 75 right and left.

The lever engaging plate 77 projects transversely outward from a transversely outer surface of an upper portion of the side wall 63*b* of the lever stay 63. The lever engaging plate 77 has engaging grooves 82 formed in an upper portion thereof for engaging the lock lever 76 in the lock position and unlock position to position the lock pin 75.

The lock lever 76 is biased in the direction to fit into the engaging grooves 82 by a spring not shown.

With the lever lock mechanism 74 having the above construction, when the lock pin 75 is withdrawn from the lock tube 78, the lock lever 76 fits into the left engaging groove 82. At this time, the loader control lever 49 can be operated freely.

When the lock lever 76 is in this unlock position, the lock lever 76 may be pulled up out of the left engaging groove 82 against the biasing force of the spring. When, subsequently, the lock pin 75 is moved rightward into the lock tube 78 and the lock lever 76 is fitted into the right engaging groove 82, the loader control lever 49 is locked against the fore and aft and right and left rocking.

In the work vehicle 1 in this embodiment, the loader control lever 49 is disposed above the rear wheel fender 15 since the loader control lever 49, if disposed inwardly of the rear wheel fender 15, will be obstructive to position changing operations of the driver's seat 16. Further, since the rear wheel 6 is present below the rear wheel fender 15, the control valve 52 cannot be disposed right under the loader control lever 49. Therefore, the control valve 52 is disposed transversely inwardly of the rear wheel fender 15. Thus, the loader control lever 49 and control valve 52 are transversely staggered relative to each other.

The loader control lever 49 cannot be disposed further rearward from the illustrated position because the position control lever 50 and accelerator lever 51 are arranged rearwardly of the loader control lever 49. Further, the control valve 52 cannot be shifted forward from the illustrated position since the control valve 52, if shifted forward from the illustrated position to substantially the same position in the fore and aft direction as the loader control lever 49, will encroach on a step portion (i.e. a footrest for the driver).

Thus, the loader control lever 49 and control valve 52 are staggered relative to each other in the fore and aft direction also.

That is, the loader control lever 49 and control valve 52 are staggered relative to each other in the fore and aft direction and in the transverse direction (The link connectors 72 and 68*c* adjacent the loader control lever 49 to which the upper ends of the interlocking links 56 and 57 are connected, and the spools 54 and 55 of the control valve 52 to which the lower ends of the interlocking links 56 and 57 are connected, are staggered relative to each other in the fore and aft direction and in the transverse direction).

Between the link connectors 72 and 68*c* adjacent the loader control lever 49 and the spools 54 and 55 of the control valve 52, there are obstacles such as the rear wheel fender 15, position control lever 50 and accelerator lever 51.

Therefore, the link connectors 72 and 68*c* adjacent the loader control lever 49 and the spools 54 and 55 of the control valve 52 cannot be directly connected using linear links. In order to avoid the obstacles, a number of relays for transmitting action from one link to another may be provided in intermediate positions of the interlocking mechanism that interlocks the loader control lever 49 and spools 54 and 55. However, this will complicate the construction.

Thus, in this embodiment, by bending one interlocking link 56 or 57, the one interlocking link 56 or 57 is placed to extend clear of the obstacles from the link connectors 72 and 68*c* adjacent the loader control lever 49 to the spools 54 and 55 of the control valve 52.

This achieves simplification of the interlocking mechanism interlocking the link connectors 72 and 68*c* adjacent the loader control lever 49 and the spools 54 and 55 of the control valve 52.

On the other hand, a rocking arm 83 for the booms is disposed adjacent the spool 54 of the boom control valve for pushing and pulling the spool 54 for the booms, and a rocking arm 84 for the bucket is disposed adjacent the spool 55 of the bucket control valve for pushing and pulling the spool 55 for the bucket.

These rocking arms 83 and 84 are inclined to shift progressively forward ahead as they extend transversely outward. Each rocking arm 83 or 84 is pivotally connected in a transversely inward position (leftward position) to the corresponding spool 54 or 55 of the control valve. Each rocking arm 83 or 84 has a boss 85 formed in a transversely outward position (rightward position) thereof. Each rocking arm 83 or 84 is pivotally connected in an upper position on a transversely intermediate portion thereof to a joint member 86 provided on a lower end portion of the corresponding interlocking link 56 or 57.

The boss 85 is supported by a support stay 87 erected on the supporting wall 60 of the valve stay 58 through a pivot 88 to be rotatable about an axis inclined leftward with respect to the fore and aft direction.

Each rocking arm 83 or 84 is inserted into a groove formed in an upper portion of the spool 83 or 84, and is pivotally connected in a leftward position to the spool 83 or 84 by a pin 89 extending through the rocking arm 83 or 84 and spool 54 or 55 in those portions. Each rocking arm 83 or 84 has a pin-receiving slot 90 formed therein for receiving the pin 89, and this slot 90 is elongated horizontally.

The loader control lever 49 and control valve 52 are staggered relative to each other in the fore and aft direction and in the transverse direction as noted above. Where the lower end of one bent interlocking link 56 or 57 is directly pivotally connected to the spool 54 or 55, a twisting force will occur between the spool 54 or 55 and the valve body. In this embodiment, the lower end of each interlocking link 56 or 57 is pivotally connected to the rocking arm 83 or 84, and each spool 54 or 55 is pivotally connected to the rocking arm 83 or 84. The elongated pin-receiving slot 90 is formed in the rocking arm 83 or 84. Thus, even where the loader control lever 49 and control valve 52 staggered relative to each other in the fore and aft direction and in the transverse direction are interlocked by one bent interlocking link 56 or 57, the spool 54 or 55 is slidable linearly to produce no twisting force between the spool 54 or 55 and the valve body.

The rocking arm 84 for the bucket has an engaging portion 91 extending from the left-hand side thereof.

The work vehicle 1 in this embodiment includes a soil spill preventive device for rocking the rocking arm 84 for the bucket. Soil scooped up by the bucket 31 tends to spill toward the driver (rearward) when the bucket 31 inclines. To prevent such soil spilling, the soil spill preventive device transmits the movement of the bucket 31 to the rocking arm 84 for the bucket to control the spool 55 for the bucket.

This soil spill preventive device includes an interlocking member 92 disposed above the control valve 52 (adjacent the rocking arm) to be rockable about a pivot shaft 94 to the rocking arm for the bucket 31, and a feedback mechanism 93 for feeding movement of the bucket 31 back to the interlocking member 92.

The interlocking member 92 is formed of a plate, and is disposed to the left of the spools 54 and 55 to extend in the fore and aft direction. The interlocking member 92 is supported in an intermediate position in the fore and aft direction by an upper portion of the valve stay 58 through the pivot 94 to be rockable about a transverse axis. The interlocking member 92 has a pressing portion 92*a* at the rear end (one end) thereof to be vertically movable.

The pressing portion 92*a* of the interlocking member 92 is engageable (contactable) with the upper surface of the engaging portion 91 of the rocking arm 84 for the bucket.

As shown in FIGS. 15-18, the feedback mechanism 93 includes a link mechanism 95 disposed on a side surface of one of the booms 29 (i.e. on an inner surface of the right-hand side boom 29 in this embodiment), and a feedback cable 96 for interlocking the link mechanism 95 and interlocking member 92.

The link mechanism 95 has first to third feedback links 97-99.

The first feedback link 97 of the link mechanism 95 is disposed in a forward region of the boom 29. The first feedback link 97 is pivotally connected at a forward end thereof to the other end of the second link 37 for bucket swinging. The rear end of the first feedback link 97 is pivotally connected to one end of a first relay link 100.

The other end of the first relay link 100 is supported by a pivot 101 provided on a side of the boom 29 to be swingable about a transverse axis.

The second feedback link 98 is disposed rearwardly of the first feedback link 97. The forward end of the second feedback link 98 is pivotally connected to the one end of the first relay link 100. The rear end of the second feedback link 98 is pivotally connected to one end of a second relay link 102.

The other end of the second relay link 102 is supported by a pivot 103 coaxial with the pin 34 which pivotally supports the bottom of the bucket cylinder 33, to be swingable about a transverse axis and relative to the bucket cylinder 33.

The third feedback link 99 is disposed rearwardly of the second feedback link 98. The forward end of the third feedback link 99 is pivotally connected to a distal end of the third relay link 104 swingable with the second relay link 102. The rear end of the third feedback link 99 is pivotally connected to one end of a fourth relay link 105.

The other end of the fourth relay link 105 is supported by a pivot 106 coaxial with the boom pivot 28 which pivotally supports the boom 29, to be swingable about a transverse axis and relative to the boom 29.

The feedback cable 96 is in the form of a push-pull cable. The feedback cable 96 includes an inner cable having one end thereof pivotally connected through a joint member 108 to a fifth relay link 107 swingable with the fourth relay link 105. The other end of the inner cable 96A is pivotally connected through a joint member 109 to the forward end (i.e. the other end) of the interlocking member 92.

One end of an outer cable 96B of the feedback cable 96 is fixed to a cable anchor 110 provided below the fifth relay link 107 in an upper position on a side of the mast 26. The other end of the outer cable is fixed to a cable anchor 111 provided below the forward end of the interlocking member 92.

With the soil spill preventive device having the above construction, when the bucket cylinders 33 are extended for causing the bucket 31 to make a dumping movement (downward rocking), the second link 37 swings forward about the pin 40 to push the first feedback link 97 backward.

As the first feedback link 97 is pushed backward, the second feedback link 98 is pushed backward through the first relay link 100, and the third feedback link 99 is pushed backward through the second relay link 102 and third relay link 104.

As the third feedback link 99 is pushed backward, one end of the inner cable 96A of the feedback cable 96 is pulled up through the fourth relay link 105 and fifth relay link 107. As the one end of the inner cable 96A is pulled up, the other end of the inner cable 96A is pulled down to swing the rear end of the interlocking member 92 upward.

When the bucket cylinders 33 are contracted for causing the bucket 31 to make a scooping movement (upward rocking), the second link 37 swings backward about the pin 40 to pull the first feedback link 97 forward.

As the first feedback link 97 is pulled forward, the second feedback link 98 is pulled forward through the first relay link 100, and the third feedback link 99 is pulled forward through the second relay link 102 and third relay link 104.

As the third feedback link 99 is pulled forward, the one end of the inner cable 96A of the feedback cable 96 is pushed down through the fourth relay link 105 and fifth relay link 107. As the one end of the inner cable 96A is pushed down, the other end of the inner cable 96A is pushed up to swing the rear end of the interlocking member 92 downward.

With this soil spill preventive device, when the bucket 31 is engaged in a usual scooping and dumping operation, the interlocking member 92 is out of contact with the engaging portion 91 of the rocking arm 84 for the bucket, not to obstruct the control of the bucket 31 by the loader control lever 49. When the bucket 31 inclines backward so that soil scooped up by the bucket 31 tends to fall backward (toward the driver), the rear end of the interlocking member 92 contacts the engaging portion of the rocking arm for the bucket 31. Consequently, the spool 55 for the bucket is depressed to prevent the soil scooped up by the bucket 31 from falling toward the driver.

FIG. 18 shows the booms 29 located in a halfway position and in an upper limit position within a vertical swinging range.

In FIG. 18, the lower state of the booms 29 and bucket 31 is a state where the bucket 31 has scooped up earth and sand, and the booms 29 are swung halfway upward, with the bucket cylinders 33 fully contracted to place the front opening plane of the bucket 31 substantially horizontal. In this state, the rear end of the interlocking member 92 of the soil spill preventive device contacts the engaging portion 91 of the rocking arm 84 for the bucket. As the booms 29 is raised from this state, the bucket 31 inclines to make the front opening plane of the bucket 31 slope rearward and downward, whereby the soil tends to fall backward from the bucket 31. At this time, the feed back mechanism 93 swings the rear end of the interlocking member 92 downward to depress the engaging portion 91 of the rocking arm 84 for the bucket 31. The spool 55 for the bucket is thereby depressed to rock the bucket 31 in the dumping direction, thereby preventing a soil spill.

In FIG. 18, the upper state of the booms 29 and bucket 31 is a state where the boom cylinders 32 are fully extended. As the bucket cylinders 33 are contracted from this state to rock the bucket 31 in the scooping direction, the rear end of the interlocking member 92 depresses the engaging portion 91 of the rocking arm 84 for the bucket 31 before the bucket 31 inclines so that the earth and sand in the bucket 31 fall backward. In this way, the rocking in the scooping direction of the bucket 31 is restricted, thereby preventing a soil spill.

Figure 1:
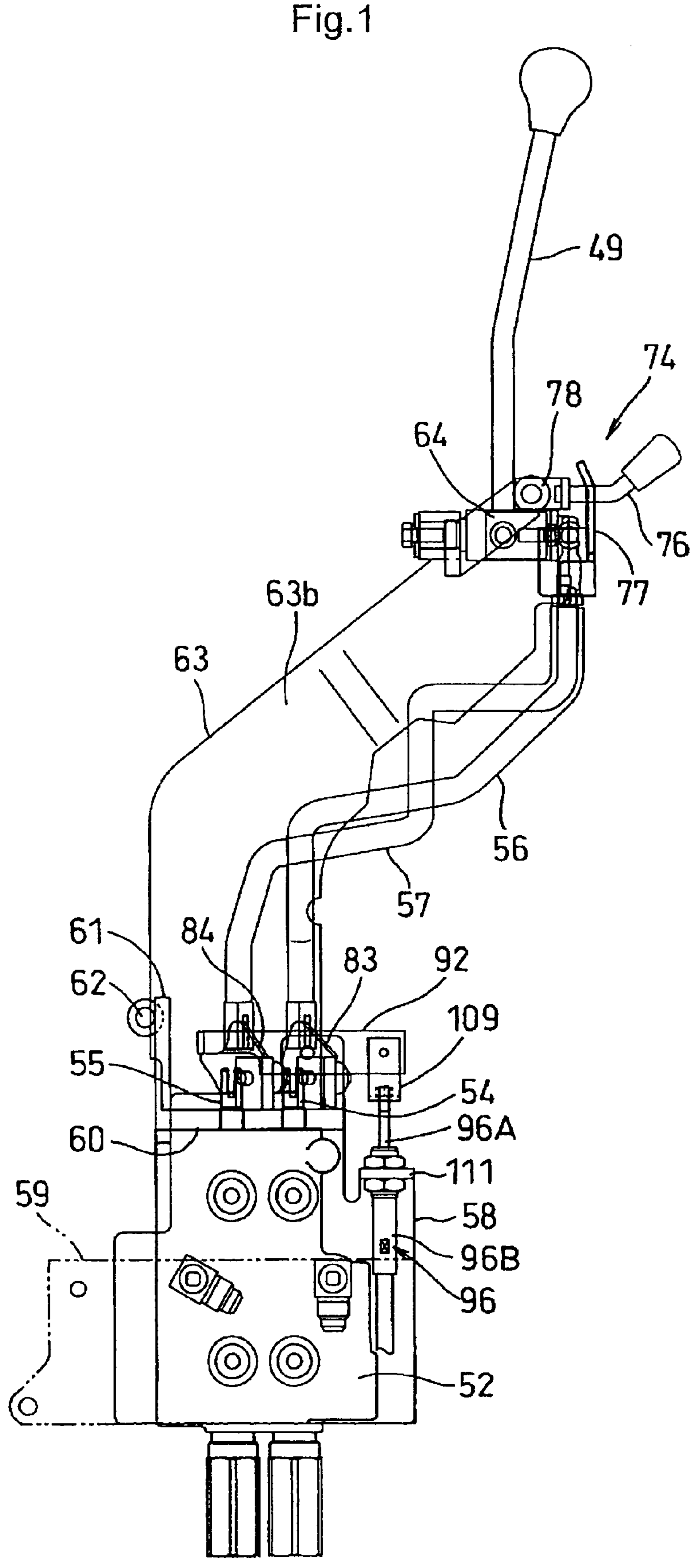
FIG. 1 is a side view of a control apparatus for a front loader.
Figure 2:
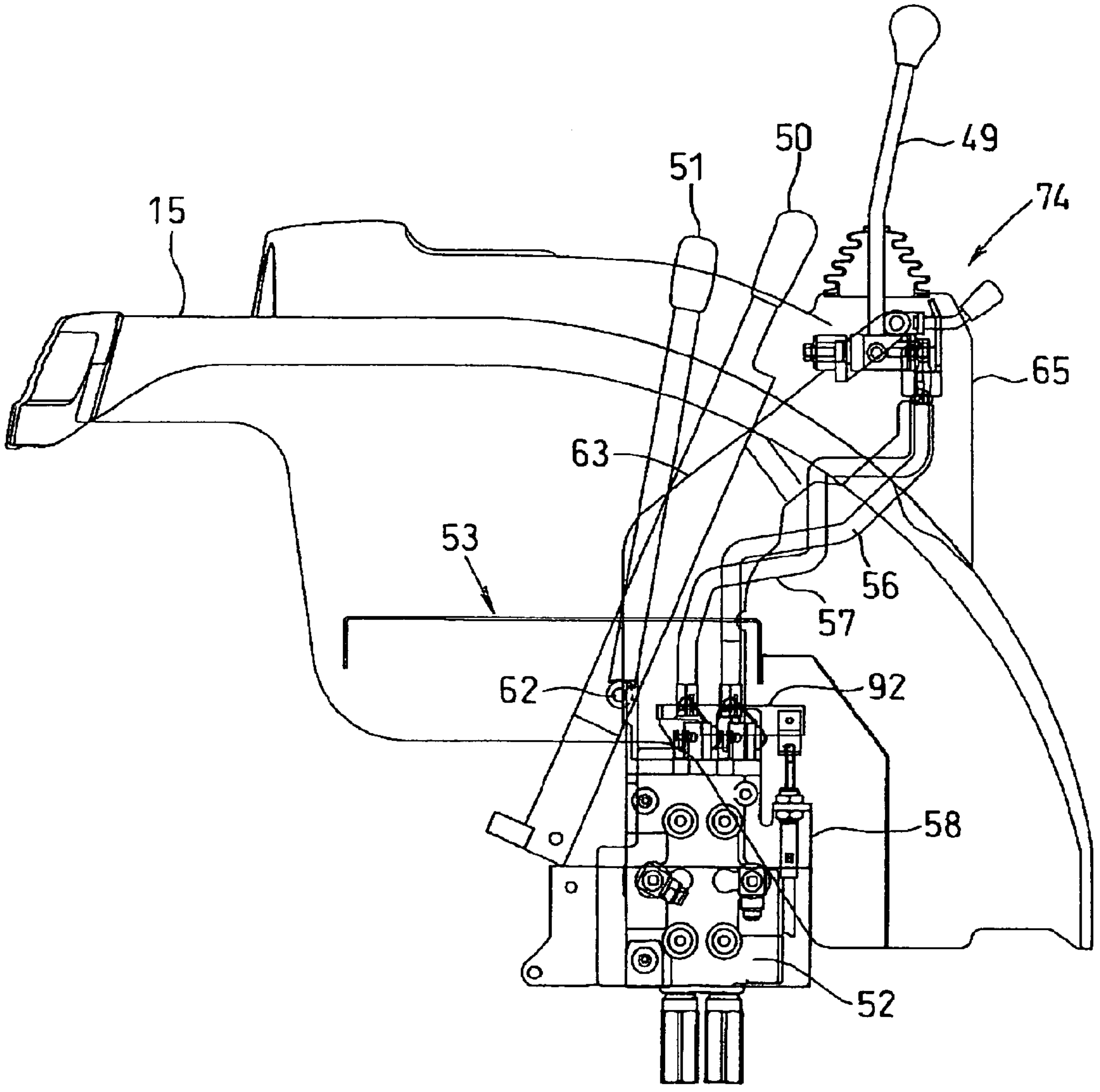
FIG. 2 is a side view showing an arrangement of the control apparatus for the front loader.
Figure 3:
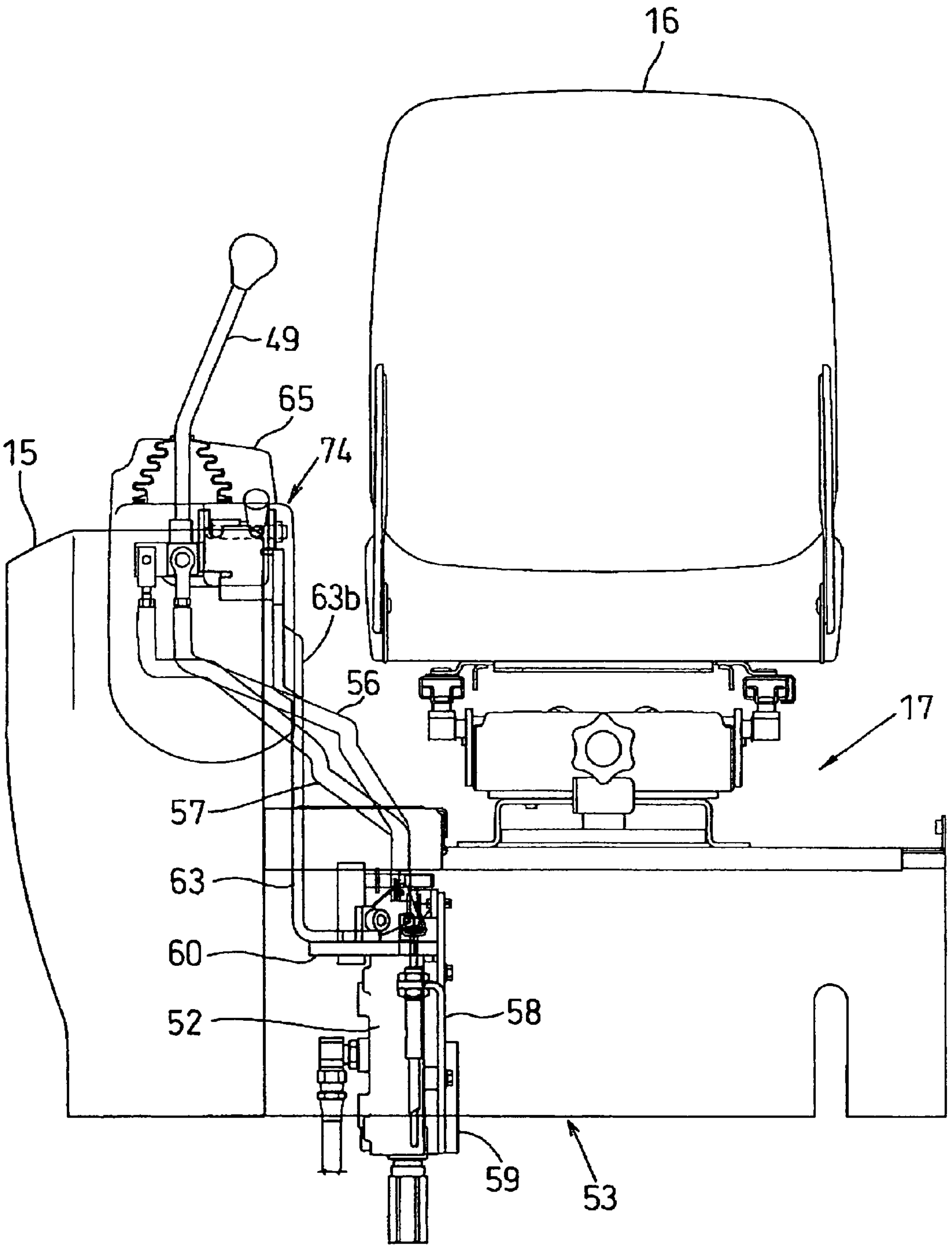
FIG. 3 is a front view showing the arrangement of the control apparatus for the front loader.
Figure 4:
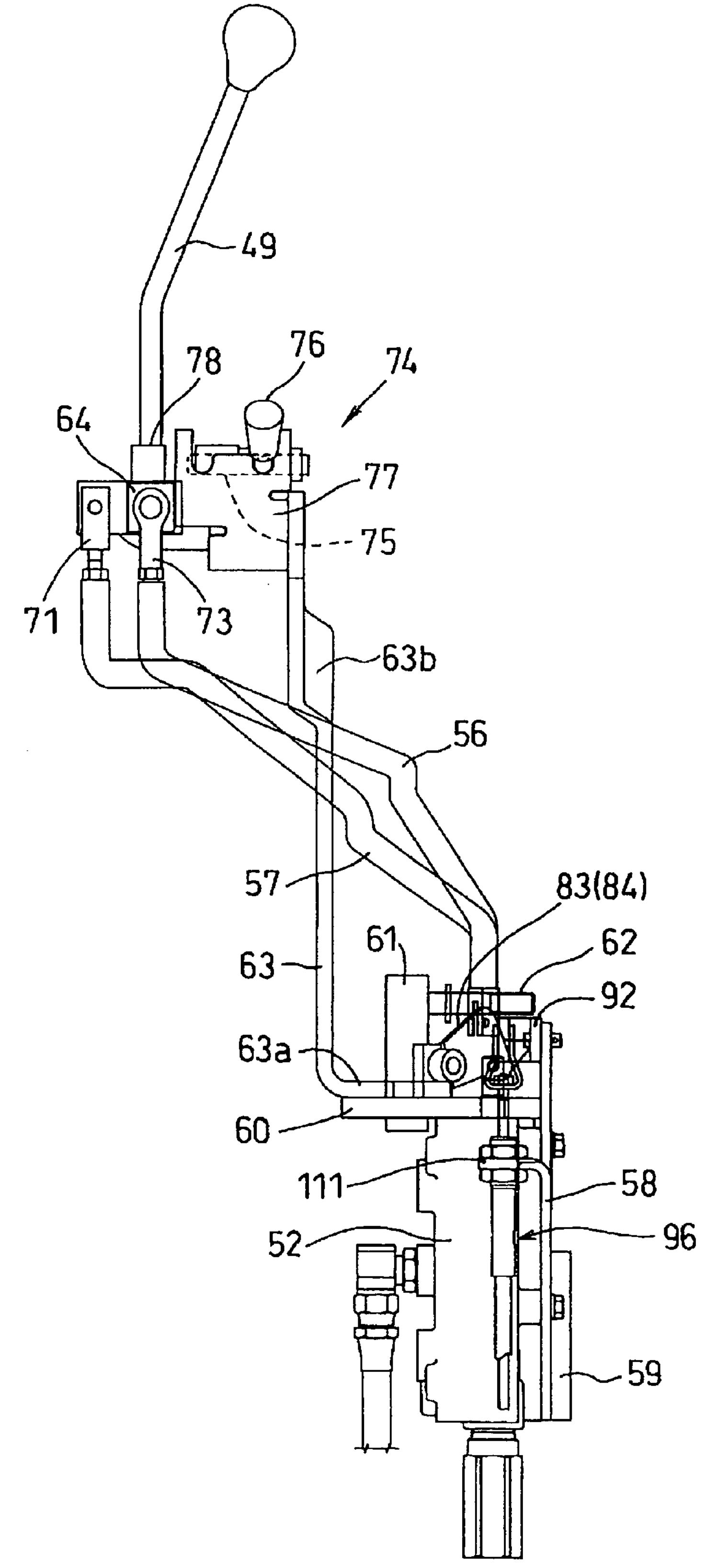
FIG. 4 is a front view of the control apparatus for the front loader.
Figure 5:
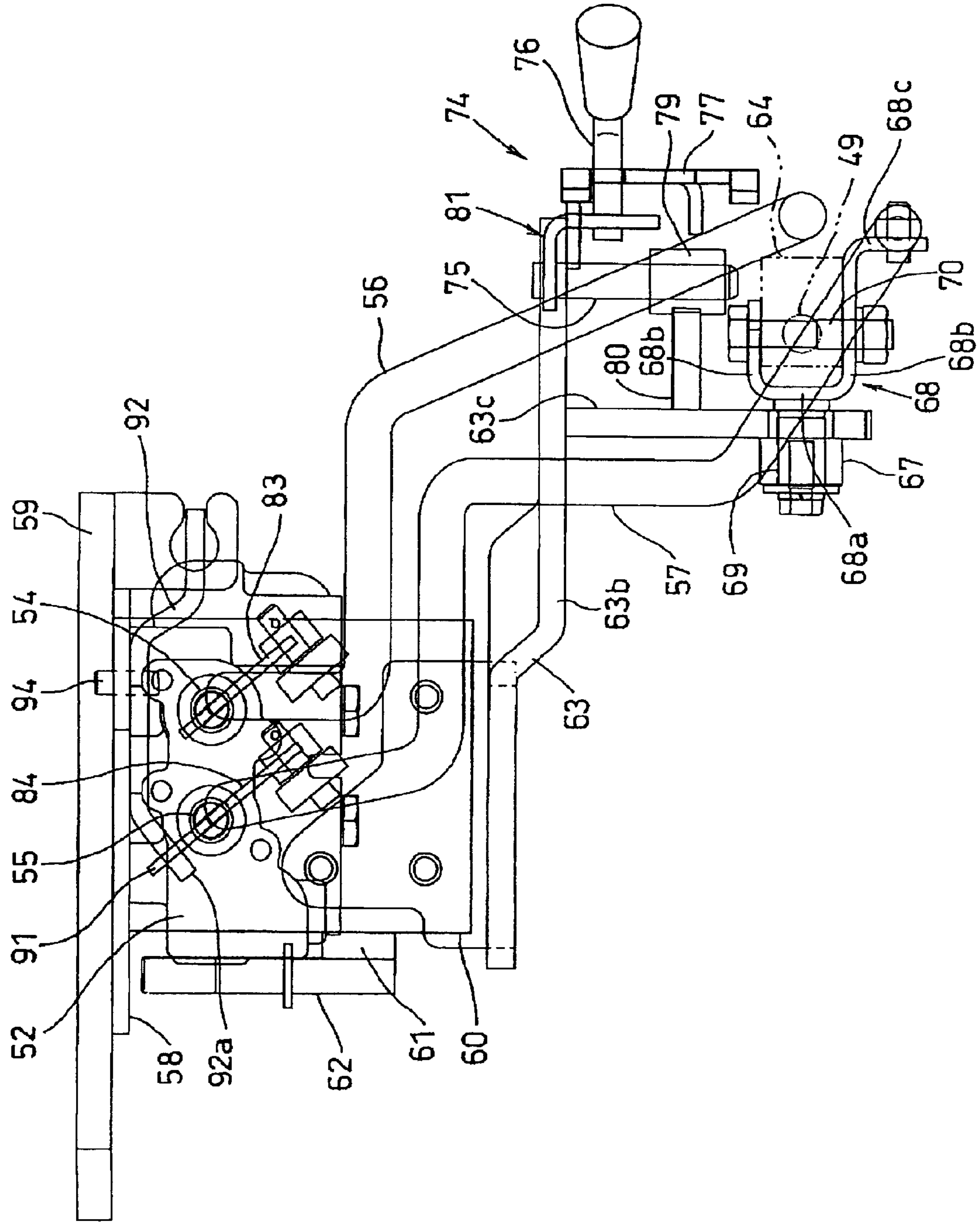
FIG. 5 is a plan view of the control apparatus for the front loader.
Figure 6:
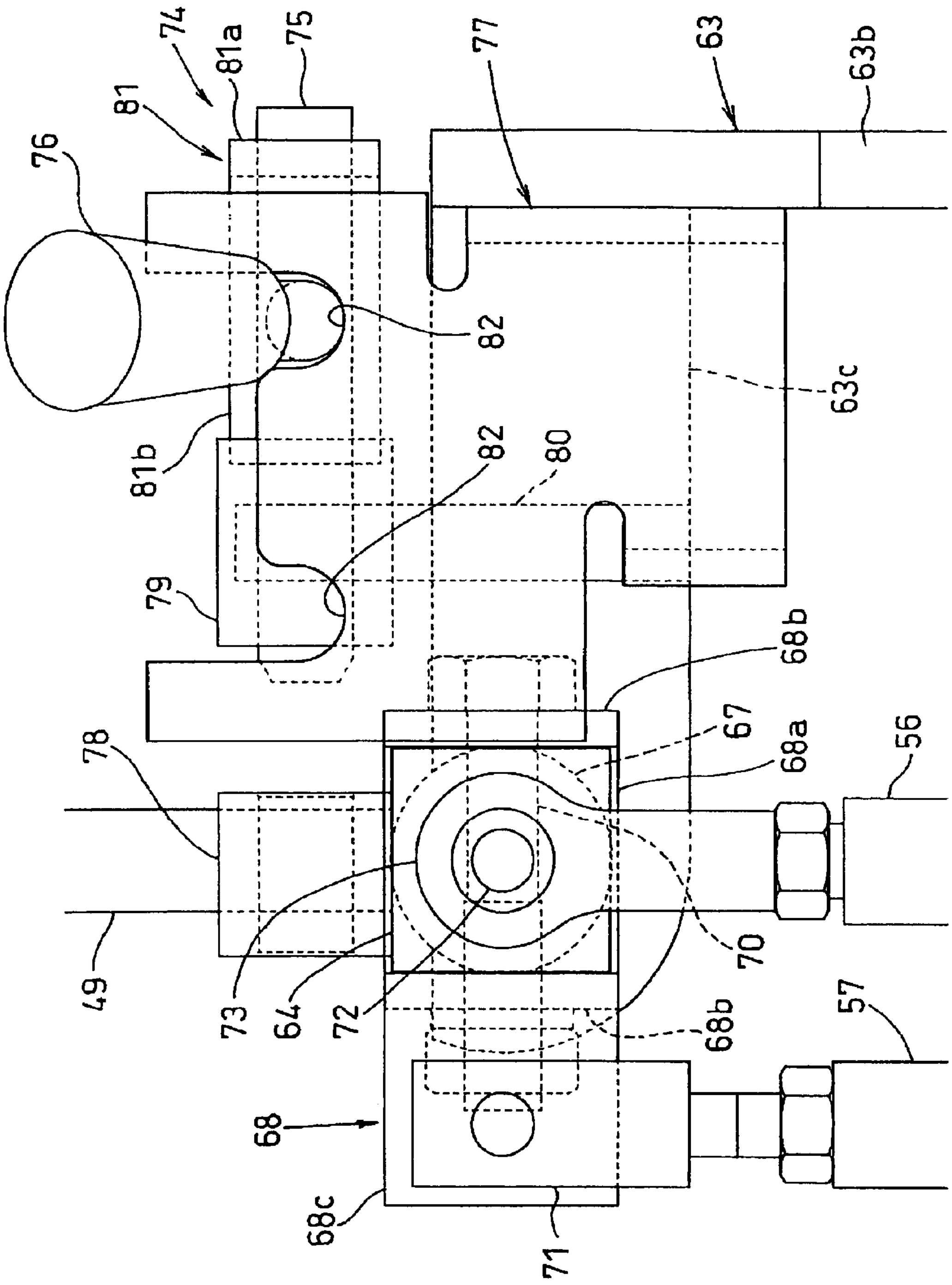
FIG. 6 is a front view of a pivotal support portion of a loader control lever.
Figure 7:
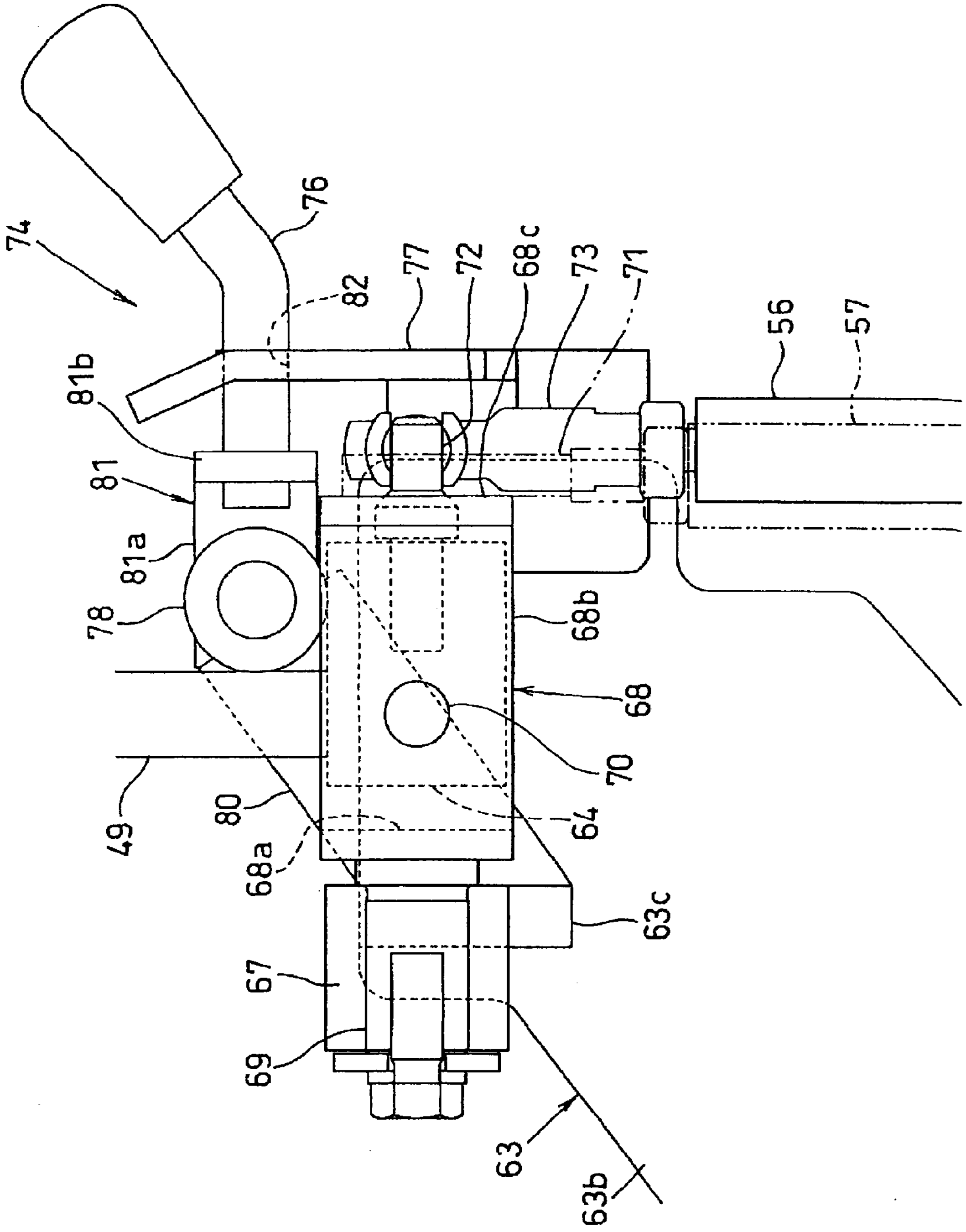
FIG. 7 is a side view of the pivotal support portion of the loader control lever.
Figure 8:
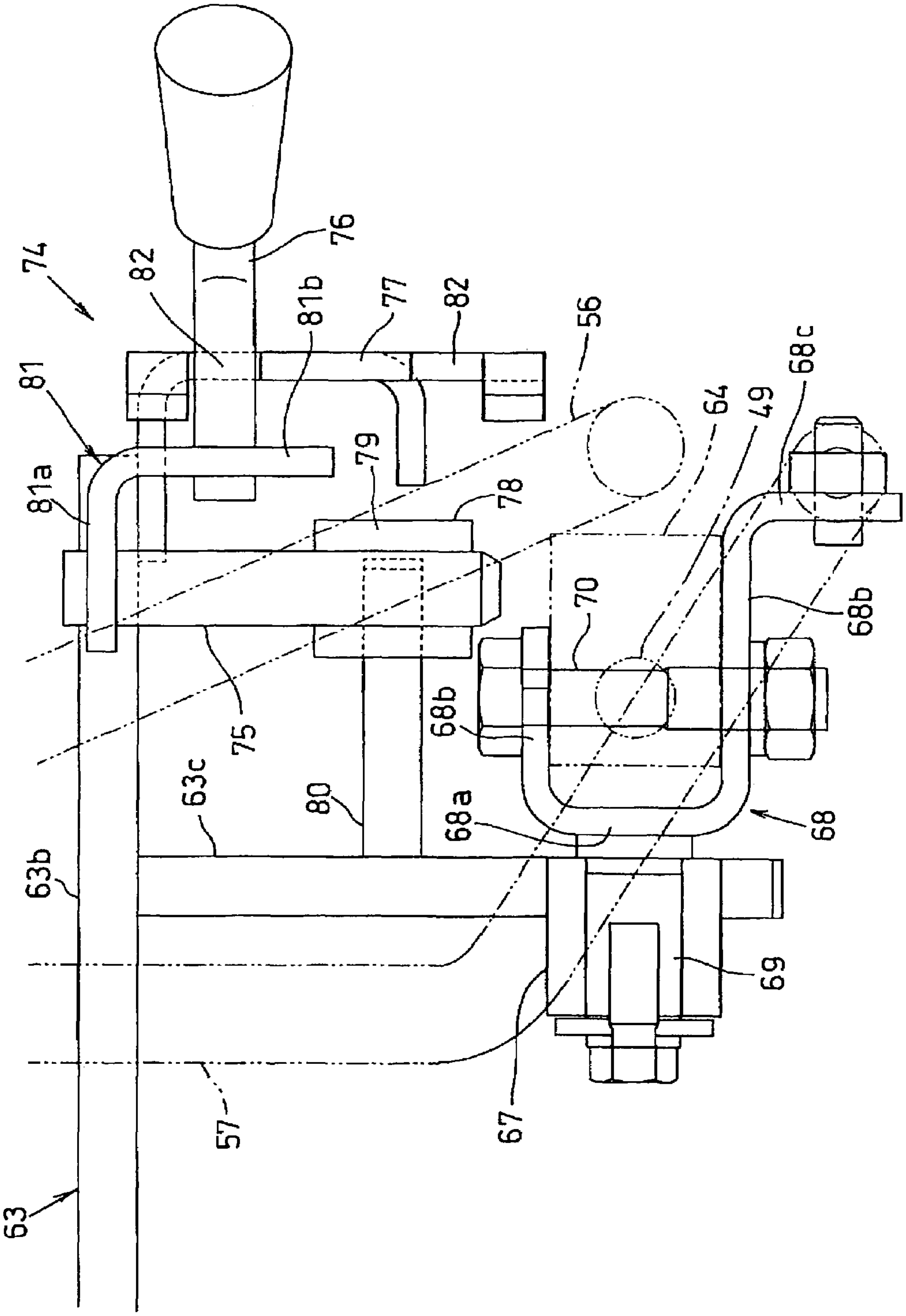
FIG. 8 is a plan view of the pivotal support portion of the loader control lever.
Figure 9:
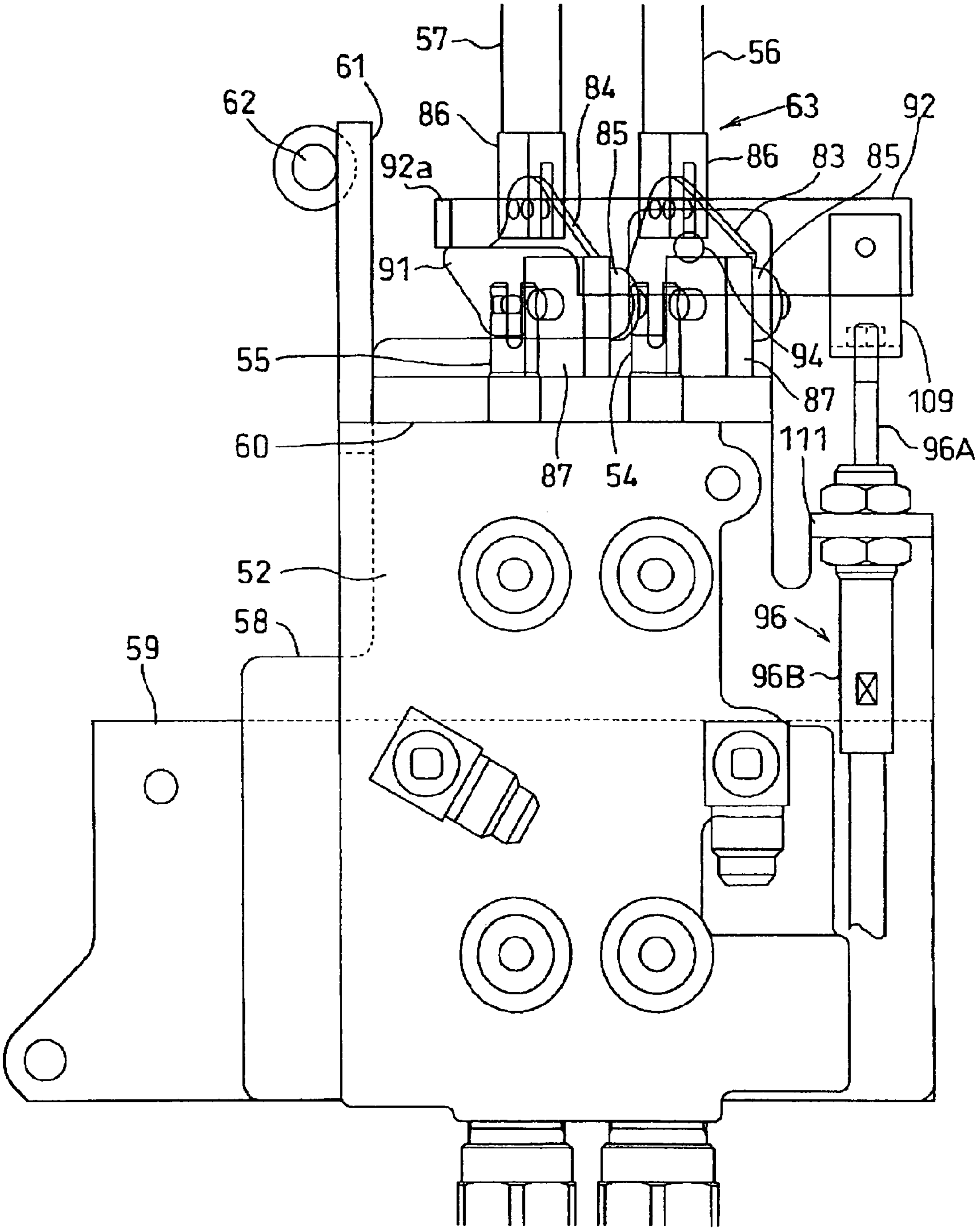
FIG. 9 is a side view of a control valve and adjacent components.
Figure 10:
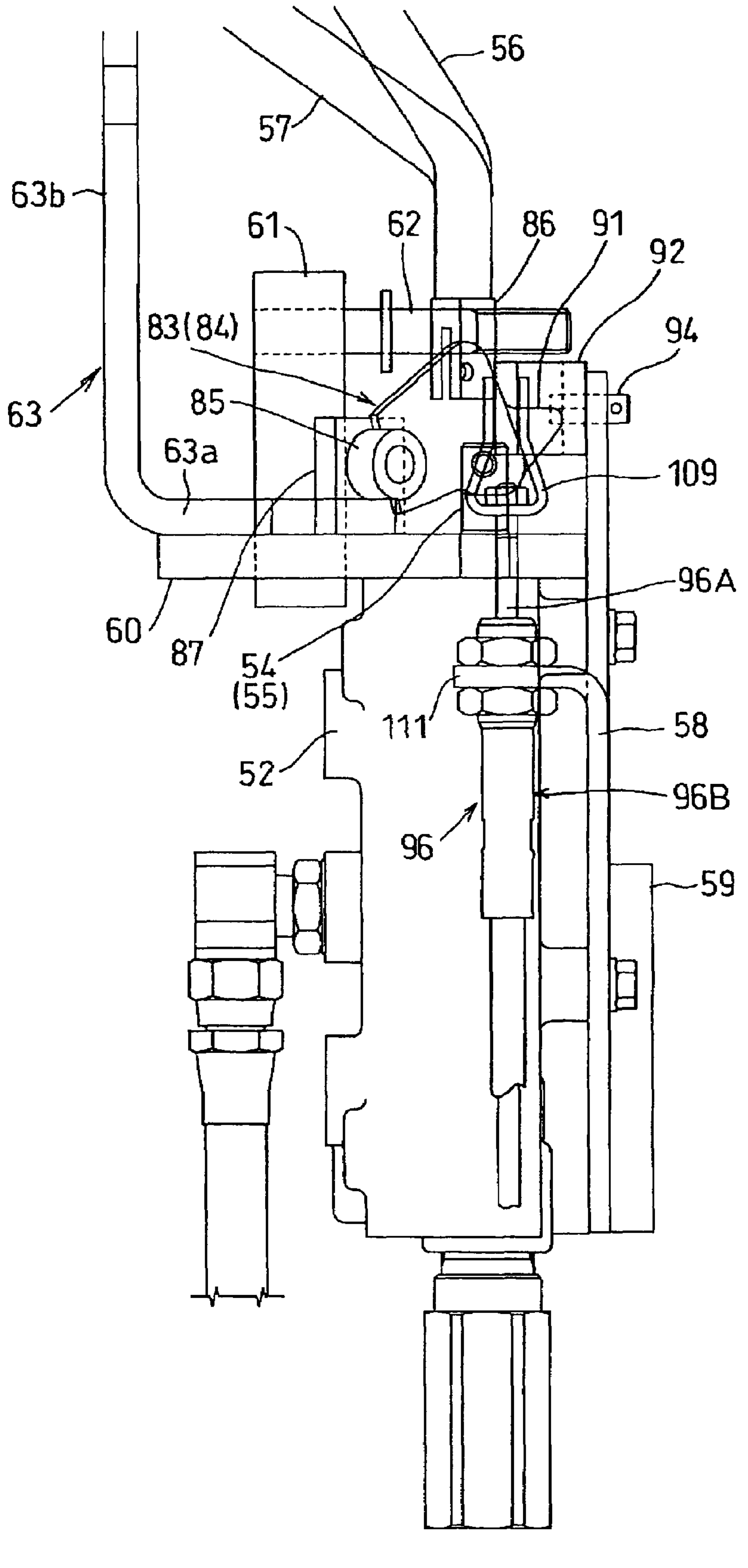
FIG. 10 is a front view of the control valve and adjacent components.
Figure 11:
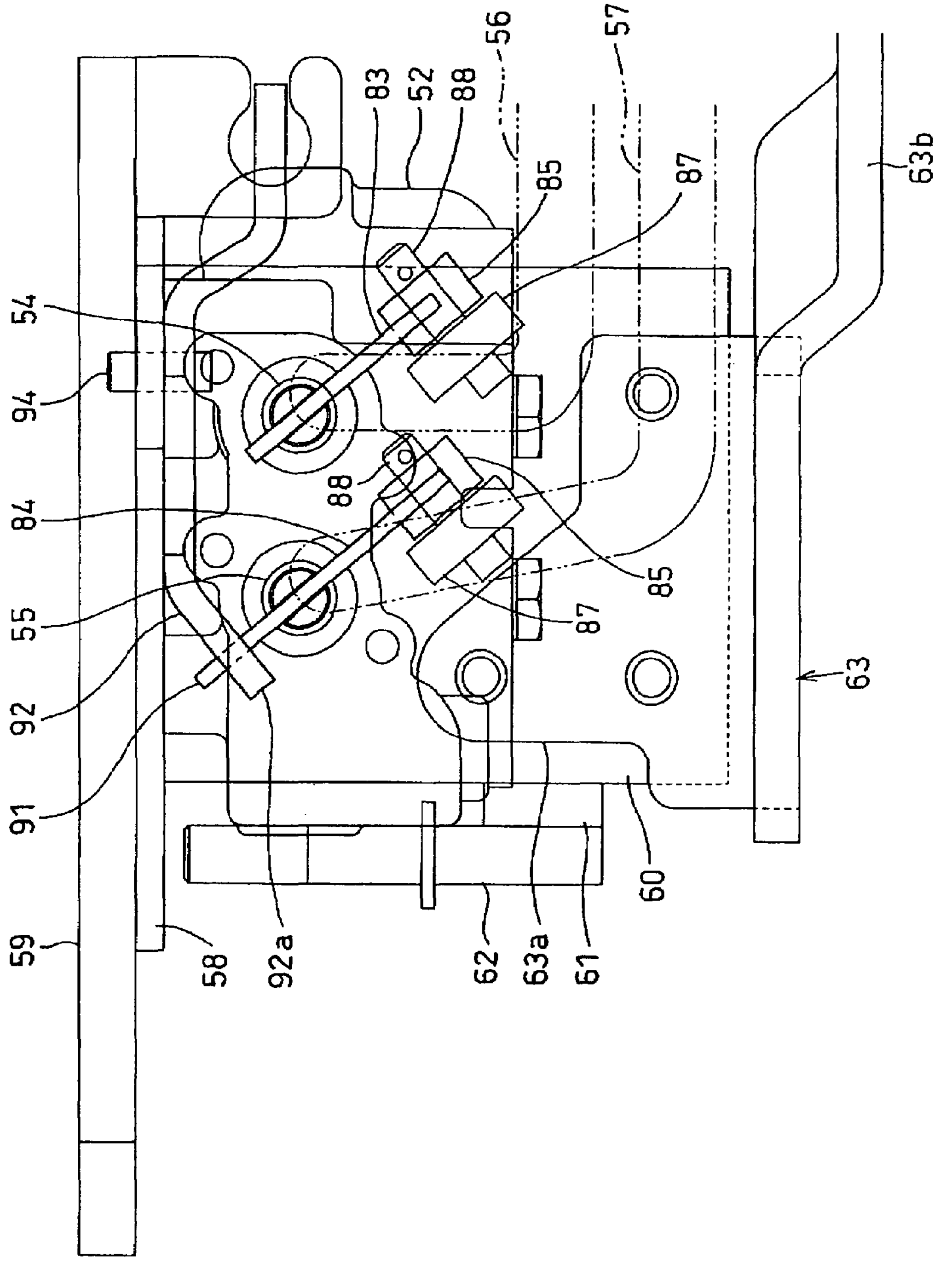
FIG. 11 is a plan view of the control valve and adjacent components.
Figure 12:
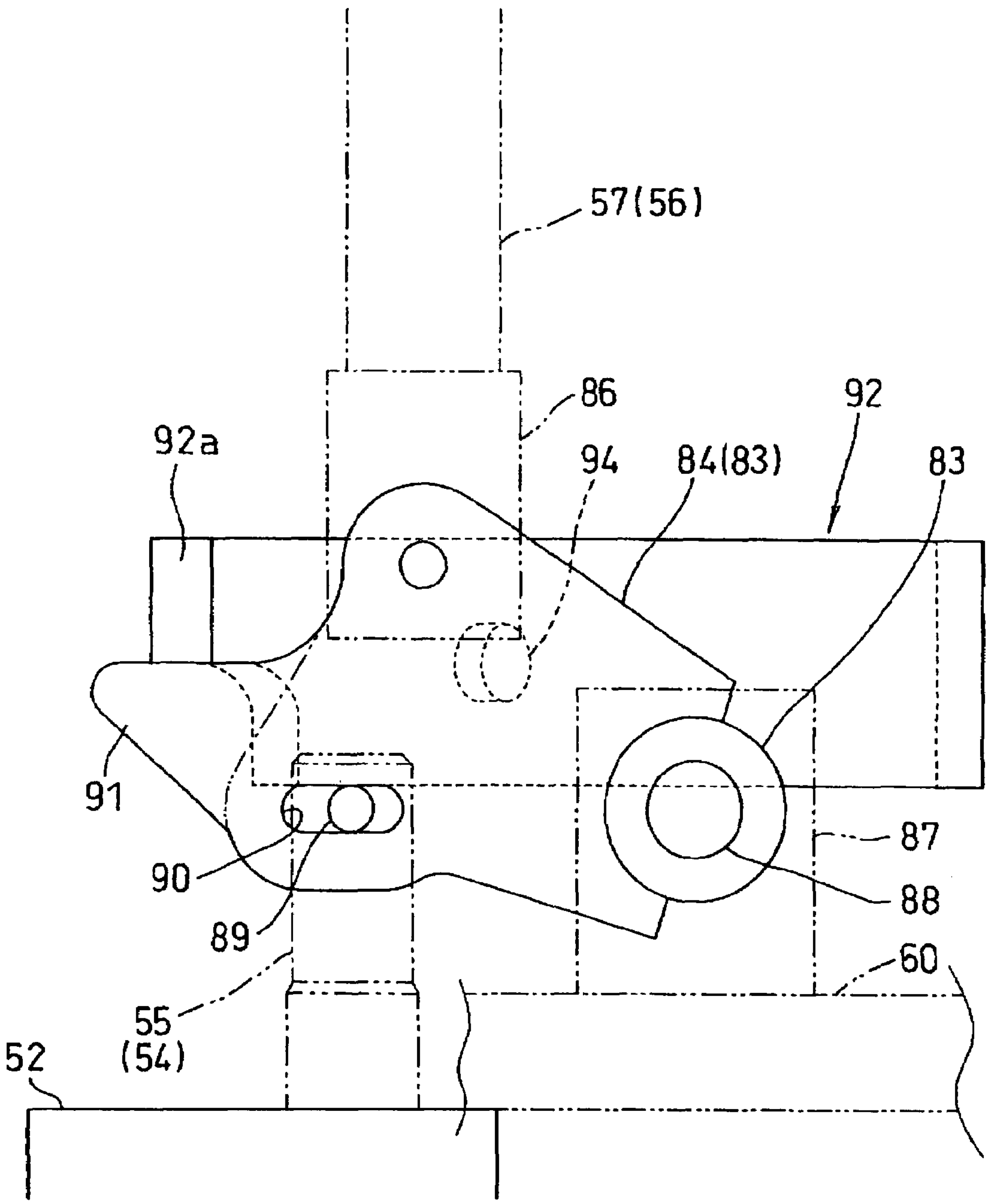
FIG. 12 is a view, seen from an obliquely rearward direction, of an interlock portion of an interlocking link and a spool.
Figure 13:
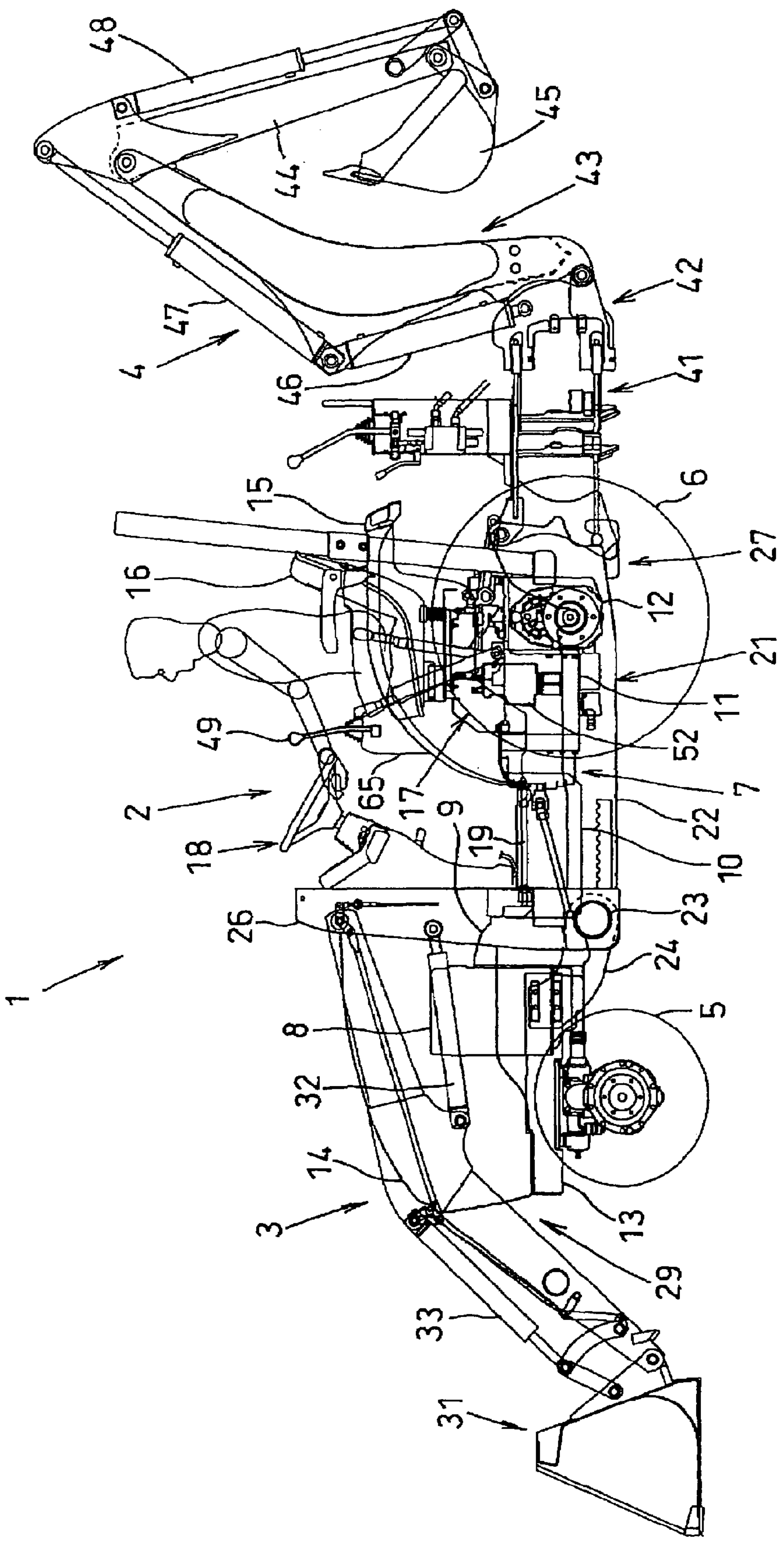
FIG. 13 is a side view of a work vehicle.
Figure 14:
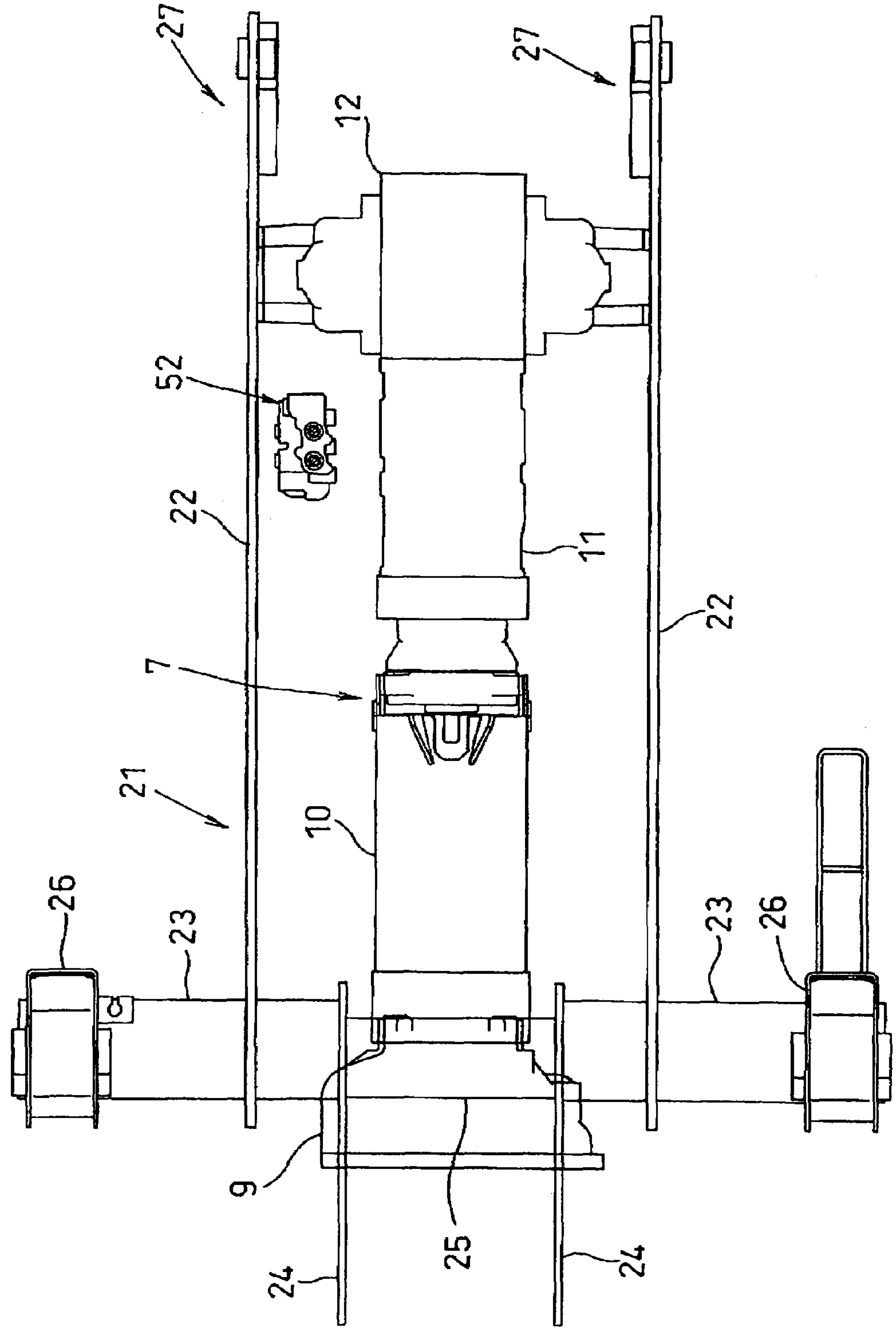
FIG. 14 is a plan view of a vehicle body and a working implement mounting frame.
Figure 15:
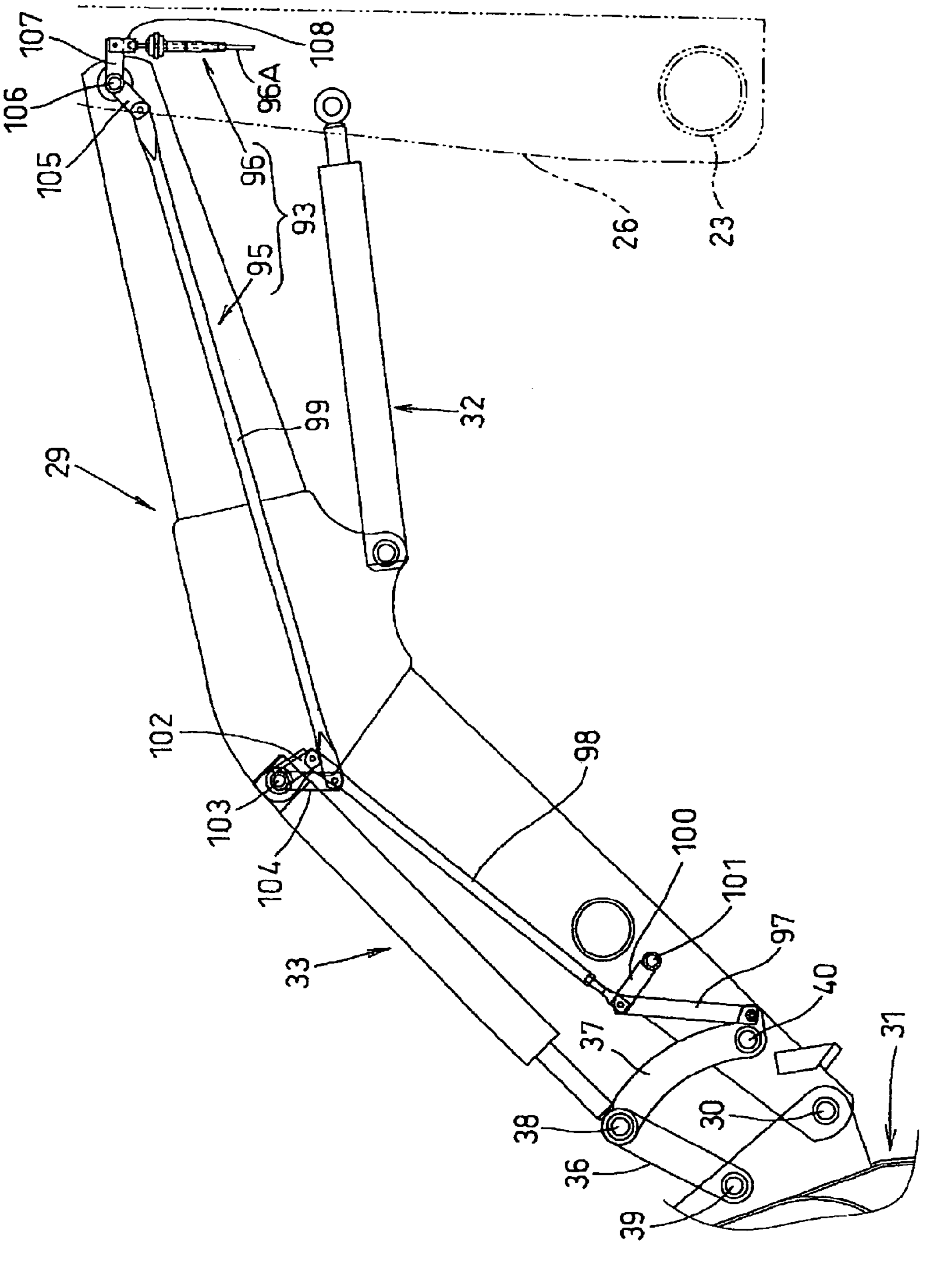
FIG. 15 is a side view of the front loader and a feedback mechanism.
Figure 16:
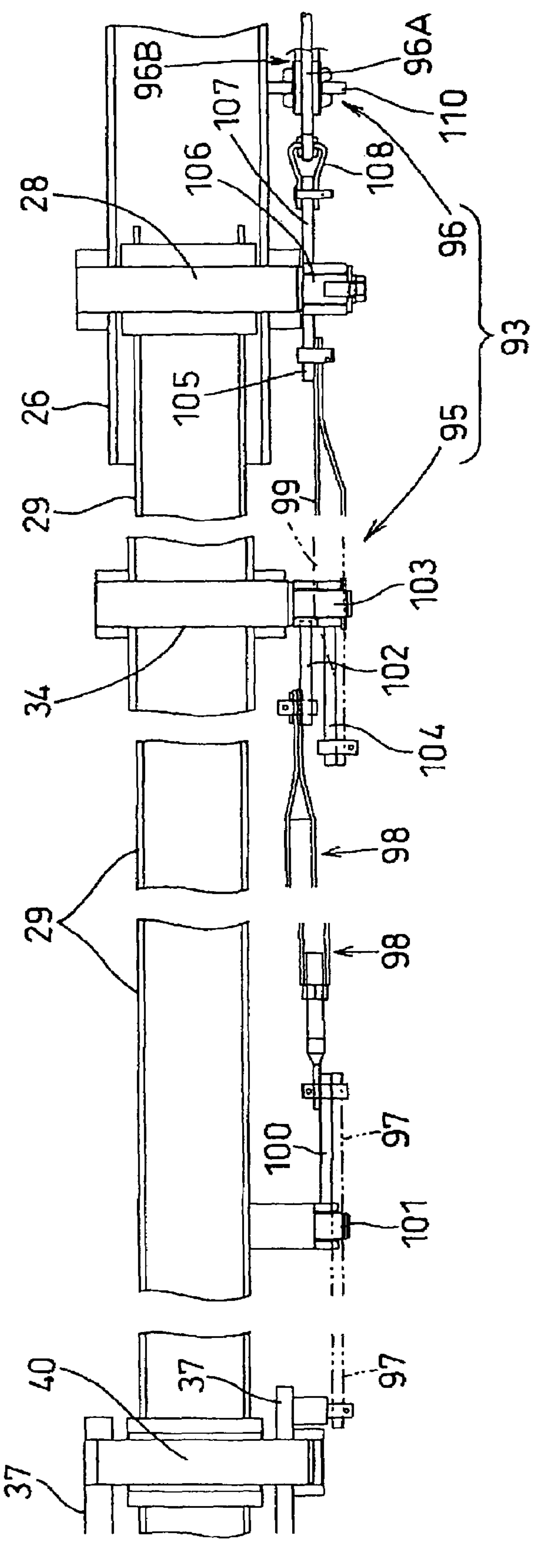
FIG. 16 is a plan view of the feedback mechanism.
Figure 17:
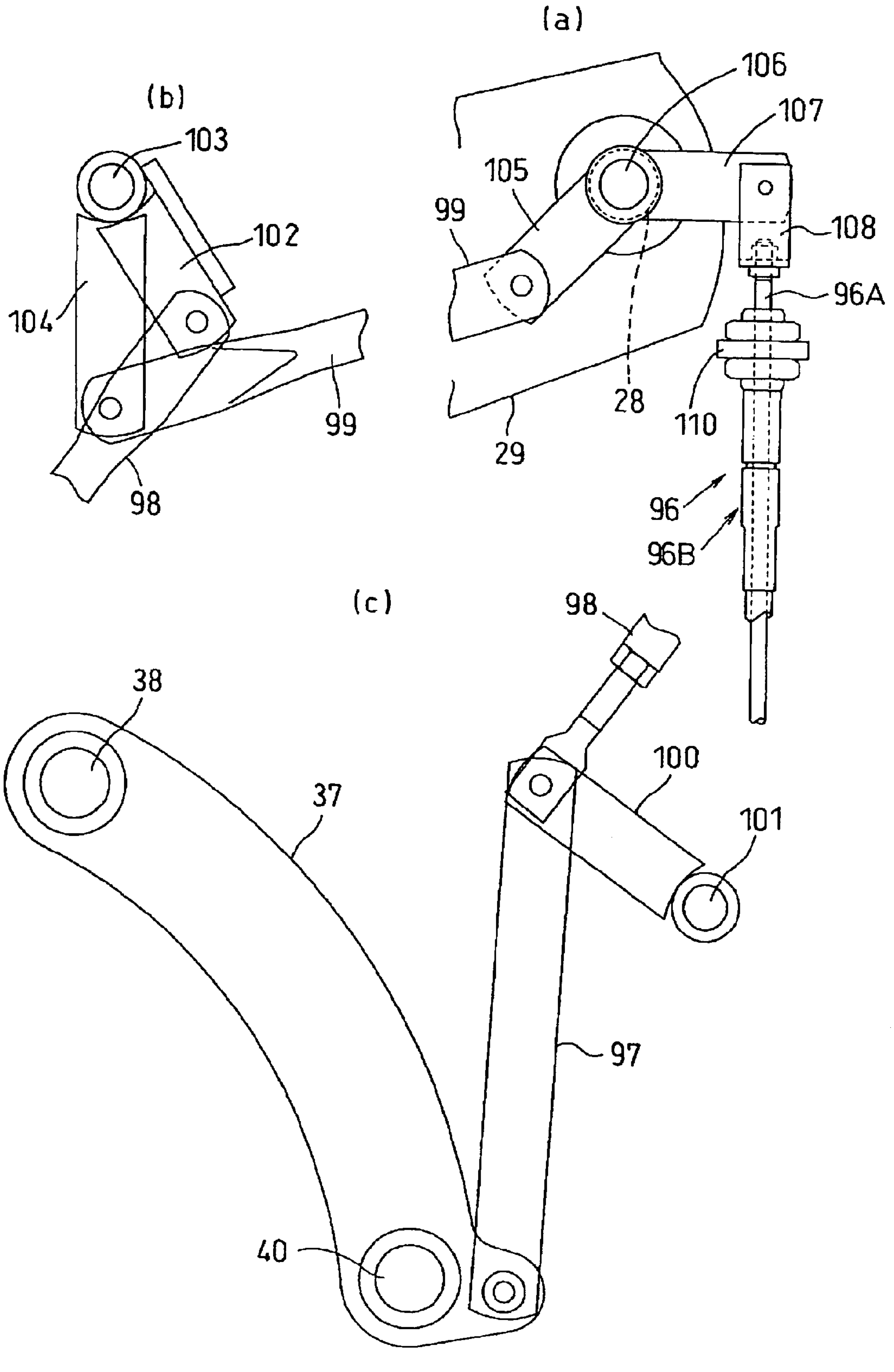
FIG. 17 is an enlarged view of relays of the feedback mechanism.
Figure 18:
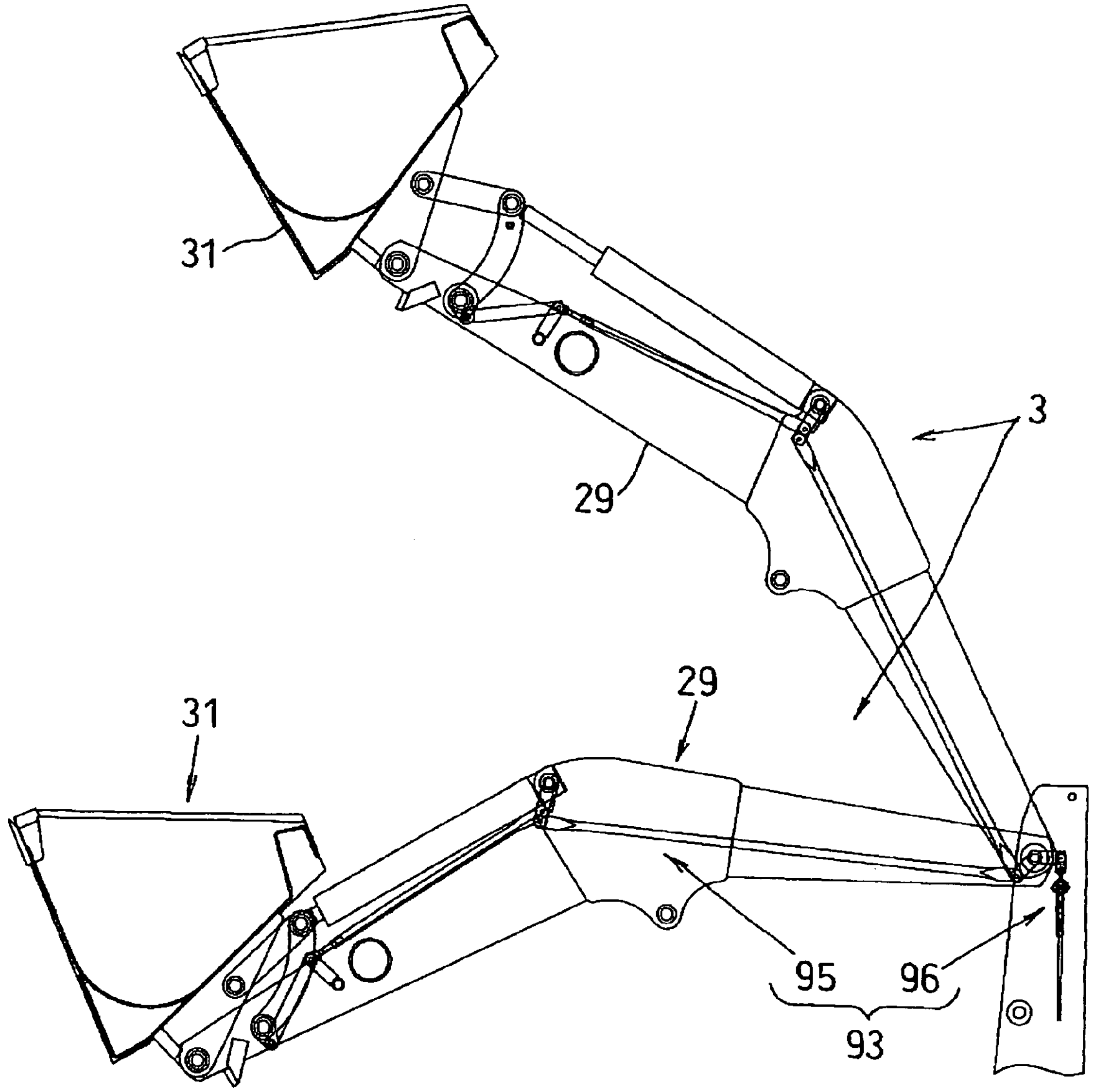
FIG. 18 is a side view showing booms in swung states.

What is claimed is:

1. A work vehicle with a working implement, comprising:

a control lever for controlling the working implement, said control lever being rockably disposed laterally of a driver's seat mounted on a vehicle body;

a control valve disposed laterally of the vehicle body such that the control valve is positioned substantially beneath the driver's seat, the control valve provided for controlling actuators that drive said working implement; and interlocking links for interlocking said control lever and spools of said control valve, and transmitting rocking of said control lever to said spools;

wherein each of said interlocking links has one end thereof connected to a first link connector connected to said control lever and the other end thereof connected to a second link connector, said second link connector comprising a rocking arm that is pivotally connected in a transversely inward position to one of said spools and is pivotally connected to an upper position on a transversely intermediate portion of the rocking arm and is connected to a lower end portion of one of said interlocking links such that the rocking arm is rockable about an axis; and wherein each of said interlocking links is formed by bending a single solid bar or pipe, to allow said control lever to be offset transversely and longitudinally from said spools of said control valve of said vehicle body.

2. A work vehicle as defined in claim 1, wherein one of said spools is linearly movable by rocking of said rocking arm.

3. A work vehicle as defined in claim 2, further comprising soil spill preventive means operable, when a bucket provided for said working implement inclines toward the said driver's seat in excess of a predetermined degree, to transmit movement of said bucket to said rocking arm, and to operate said one of the spools through the rocking arm for stopping the movement of said bucket.

4. A work vehicle as defined in claim 3, wherein said soil spill preventive means includes an interlocking member disposed adjacent the rocking arm to be rockable about a pivot, and a feedback mechanism for feeding the movement of said bucket back to said interlocking member, said interlocking member being engageable with an engaging portion of the rocking arm to rock said rocking arm.

5. A work vehicle as defined in claim 1, wherein said rocking arm has a pin-receiving slot formed therein and elongated horizontally, to be pivotally connected to the one of said spools by extending a pin through the one of said spools and said pin-receiving slot.

* * * * *

UNITED STATES PATENT AND TRADEMARK OFFICE

CERTIFICATE OF CORRECTION

PATENT NO. : 7,617,620 B2
APPLICATION NO. : 11/726378
DATED : November 17, 2009
INVENTOR(S) : Fukudome et al.

It is certified that error appears in the above-identified patent and that said Letters Patent is hereby corrected as shown below:

Title Page, Item (54) title should read:

-- WORK VEHICLE WITH STAGGERED CONTROL LEVER --

Signed and Sealed this

Sixteenth Day of March, 2010

David J. Kappos

*Director of the United States Patent and Trademark Office*

UNITED STATES PATENT AND TRADEMARK OFFICE

CERTIFICATE OF CORRECTION

PATENT NO. : 7,617,620 B2
APPLICATION NO. : 11/726378
DATED : November 17, 2009
INVENTOR(S) : Fukudome et al.

It is certified that error appears in the above-identified patent and that said Letters Patent is hereby corrected as shown below:

Title Page, Item (54) and at Column 1, lines 1 and 2, title should read:

-- WORK VEHICLE WITH STAGGERED CONTROL LEVER --

This certificate supersedes the Certificate of Correction issued March 16, 2010.

Signed and Sealed this

Sixth Day of April, 2010

David J. Kappos
*Director of the United States Patent and Trademark Office*

UNITED STATES PATENT AND TRADEMARK OFFICE

CERTIFICATE OF CORRECTION

PATENT NO. : 7,617,620 B2
APPLICATION NO. : 11/726378
DATED : November 17, 2009
INVENTOR(S) : Fukudome et al.

It is certified that error appears in the above-identified patent and that said Letters Patent is hereby corrected as shown below:

Face of the Patent, See item (54) and at Column 1, lines 1 and 2, the title should read:
-- WORK VEHICLE WITH STAGGERED CONTROL LEVER --

Face of the Patent, See item (56) References Cited, U.S. PATENT DOCUMENTS, add the following U.S. references:

| | | | |
|---|---|---|---|
| -- 4,825,568 | 5/1989 | Kawamura et al. | 37/118 |
| 5,501,570 | 3/1996 | Mozingo | 414/700 |
| 3,521,781 | 9/1968 | Holsinger et al. | 214/764 |
| 3,536,216 | 10/1970 | Brownell | 214/138 |
| 3,534,881 | 10/1970 | Horsch | 214/762 |
| 4,431,364 | 2/1984 | Redenbarger et al. | 414/697 -- |

This certificate supersedes the Certificates of Correction issued March 16, 2010 and April 6, 2010.

Signed and Sealed this
Fifteenth Day of February, 2011

David J. Kappos
*Director of the United States Patent and Trademark Office*